June 25, 1946.                J. C. TRAVILLA, JR                 2,402,711
                                  ENGINE TRUCK
                  Filed Dec. 2, 1943              2 Sheets-Sheet 1

INVENTOR;
JAMES C. TRAVILLA JR.

BY *Rodney Bedell*
ATTORNEY

Patented June 25, 1946

2,402,711

UNITED STATES PATENT OFFICE 2,402,711

ENGINE TRUCK

James C. Travilla, Jr., Swarthmore, Pa., assignor to General Steel Castings Corporation, Granite City, Ill., a corporation of Delaware Application December 2, 1943, Serial No. 512,539

15 Claims. (Cl. 105—174)

The invention relates to railway rolling stock, and more particularly to a two-wheel truck of the type generally used at the front end of a locomotive as a pilot truck although it may be used also at the rear end of the locomotive as a trailer truck. Trucks of this type generally include a frame, with pedestals for receiving the axle journal boxes, or an axle journal housing extending between the wheels, and a bolster supported from the frame so as to move laterally thereof, particularly on curved track. The frame and axle journals may be positioned outwardly of the wheels to facilitate the assembly of the truck springs and to better accommodate the lateral motion of the bolster, and its supporting elements, which are positioned between the frame wheel pieces, or the frame and axle journals may be positioned inwardly of the wheels, in which latter case the clearance between the bolster, and its supports, and the other truck parts is restricted.

One object of the present invention is to reduce the weight of a truck of the class described and to provide desirable clearance between the truck and adjacent locomotive parts such, for example, as the steam cylinders on the locomotive main frame, and between the bolster and other truck parts when the frame and journals are inwardly of the wheels.

This latter arrangement may result in difficulty because of the presence of the truck springs inwardly of the wheels, particularly when the axle mounts roller bearing boxes or housings which move with the axle laterally of the frame a sufficient amount to cause lateral stresses to be thrown into the springs with resultant tendency to spring breakage. Another object of the invention is to support the truck springs from the axle housing or the journal boxes, so as to avoid such transverse thrust on the springs.

Another object of the invention is to facilitate inspection of and access to springs supported from inside bearing boxes, and this object is accomplished by suspending the springs beneath the frame and from the opposite ends of equalizers extending longitudinally of the truck over the boxes.

Another object of the invention is to accommodate lateral movement of a bolster in a truck frame which is supported by springs from an inside bearing box.

These general objects and other detail objects as will appear from the following description are attained by the structure illustrated in the accompanying drawings, in which—

Figure 1:
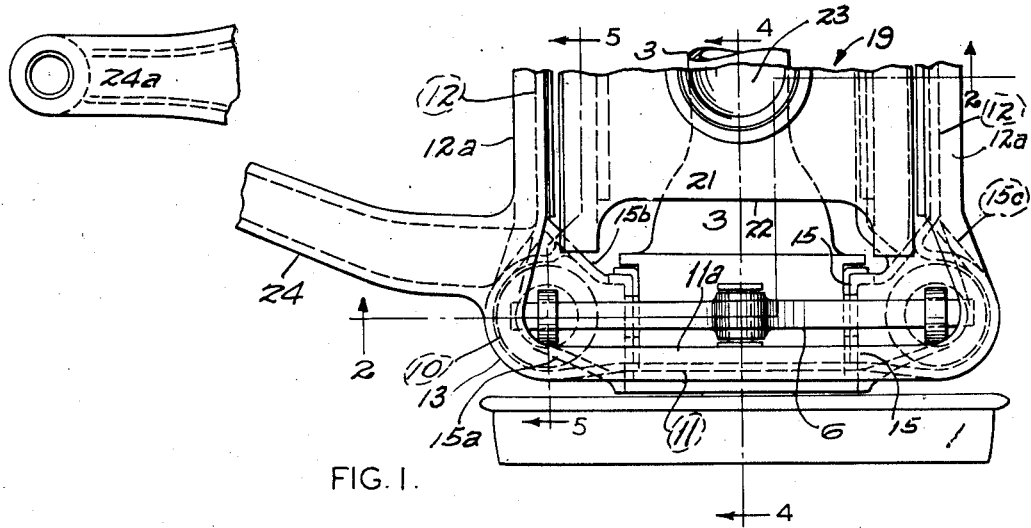
Figure 1 is a top view of one longitudinal half of an engine two-wheel truck with a radius bar for attachment to the engine frame.
Figure 2:
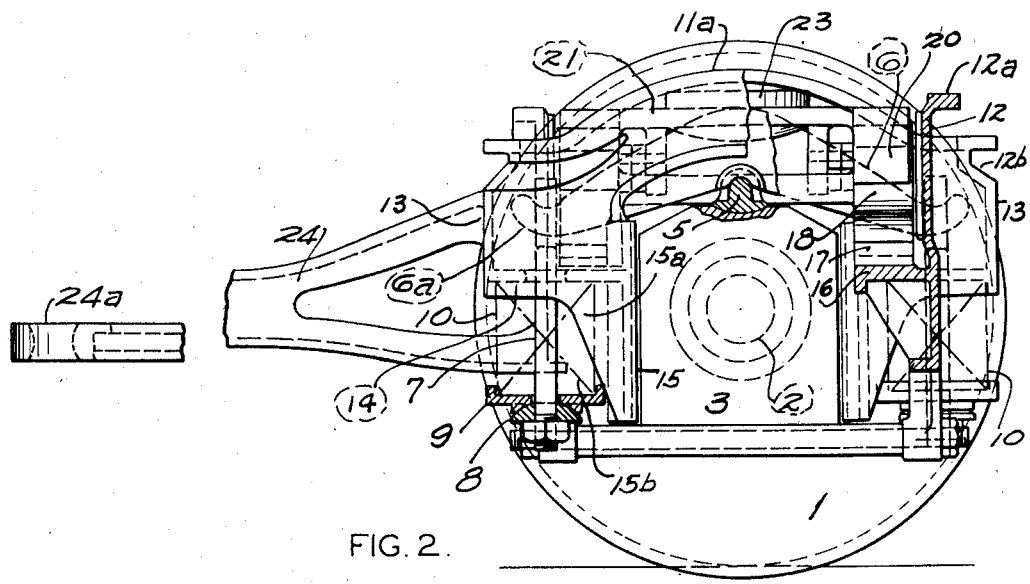
Figure 2 is a side view of the structure shown in Figure 1, some of the parts being sectioned along the line 2—2 of Figure 1.
Figure 3:
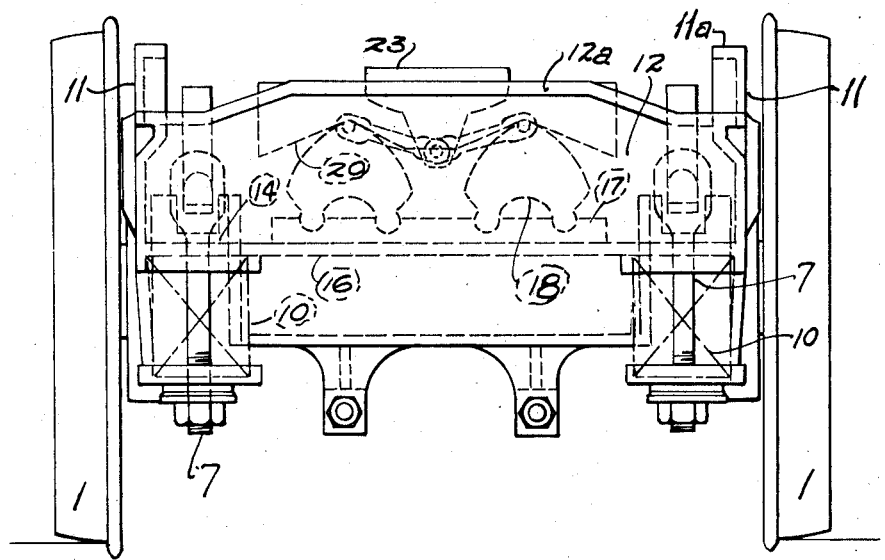
Figure 3 is an end view of the structure shown in Figures 1 and 2 looking towards the right hand end of the structure.

The truck wheels 1 mount the axle 2 which is fitted with a roller bearing housing 3 extending between the wheels and receiving the roller bearings and their races in a well known manner so that the housing is held against movement longitudinally of the axle. If desired, however, a separate box can be used on each side of the truck instead of a single housing.

Each end of the housing is provided with a central pivot bearing 5, and an equalizer bar 6 has an elevated central portion recessed to fit over bearing 5 and has drop ends 6a extending beyond the sides of the housing at a substantially lower level than the central portion. Links 7 are pivotally suspended from the ends of the equalizer and at their lower ends carry washers 8 which mount seats 9 for the truck springs 10, here shown as of coil type surrounding the suspension links. The opposed faces of seat 9 and washer 8 are concavo-convex to better accommodate swinging of link 7 from its normal vertical position without inclining seat 9 from its normal horizontal position. The truck frame includes side members or wheel pieces and end members or transoms each comprising a vertical web 11 and 12 respectively and a horizontal top reenforcing flange 11a and 12a respectively. At each corner of the frame, webs 11 and 12 are offset outwardly of the truck and merge with each other in an arcuate web, as indicated at 13. Reenforcing flanges 11a and 12a also merge with each other and immediately below these flanges webs 11 and 12 are inclined inwardly, as indicated at 11b and 12b. A horizontal web 14 extends across the corner between webs 11 and 12 to form a cap for the adjacent spring 10. This arrangement provides for positioning the spring so that portions of its coils project transversely and longitudinally, outwardly of the truck a greater distance than vertical webs 11 and 12 of the wheel pieces and transoms except at the corners of the truck.

Transverse vertical webs 15 extend downwardly and inwardly from each side member web 11 at each side of the axle housing 3 and form pedestal legs slidably engaging the housing. Reenforcing flanges 15a, 15b and 15c extend between pedestal webs 15 and the underside of web 14. A lateral motion bolster is carried on the frame by rollers or rockers, the latter-mentioned arrangement being illustrated, and the bolster support comprises shelves or ledges 16 on webs 11 and 12 mounting renewable rocker seats 17 for rockers 18 being at opposite sides of the longitudinal center line of the truck and each having spaced trunnions 18a received in recesses in a seat 17.

The truck bolster 19 has forward and rear top rocker bearings 20 extending transversely of the truck and seated on the upper faces of rockers 18. This rocker mounting of the bolster is well known in the art and provides for lateral movement of the bolster relative to the truck frame. The horizontal top web 21 of the bolster is recessed, transversely of the truck, as indicated at 22, intermediate the spaced rocker bearings 20, and between recesses 22 the top web forms an integral center plate 23 through which the load is applied to the truck.

Figure 4:
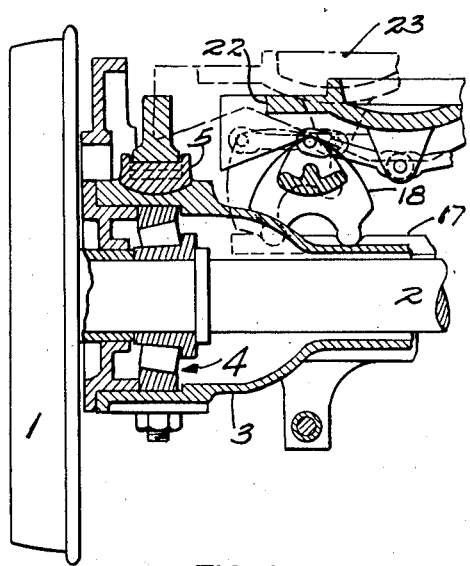
Figures 4 and 5 are vertical transverse sections taken on the corresponding section lines of Figure 1 and each showing approximately half of the truck.
Figure 5:
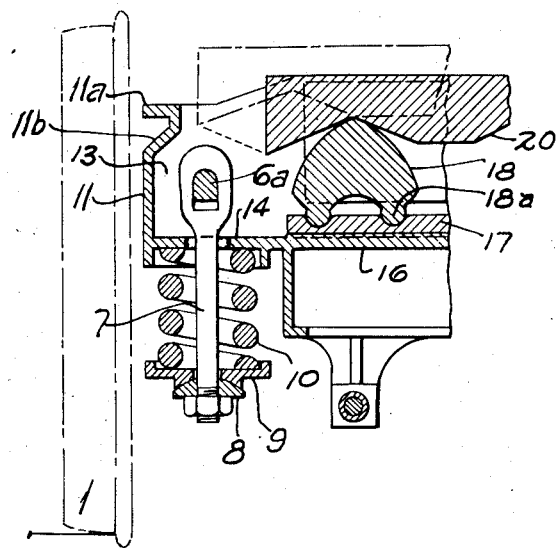

Upon reference to Figure 4, it will be seen that when the bolster is in its normal position its top web 21 and center plate 23 are approximately at the same level as the central elevated portion of the equalizer 6 but is spaced substantially from the equalizer transversely of the truck. Bolster rocker bearings 20 extend to a lower level but are spaced longitudinally of the truck from the central elevated portion of the equalizer 5. When the bolster moves transversely of the truck and is elevated by the action of the rockers, as indicated in broken lines in Figures 4 and 5, the ends of its rocker bearings 20 clear the end portions 6a of the adjacent equalizer.

While the middle portion of the bolster does not extend over the middle portion of the equalizer, when the bolster moves transversely of the truck, it does extend over the elevated portion of axle housing 3 which surrounds the roller bearings and over the pedestal forming webs 15.

Each wheel piece has its upright web 11 positioned a short distance inwardly of the adjacent wheel, thus providing a substantial space between the wheel piece and the longitudinal center line of the truck for mounting the equalizer, hangers, springs, rockers and bolster.

The corner arrangement provides space for aligning the lateral motion device rockers and the inside hung springs transversely of the truck, thereby reducing bending moment on the wheel pieces. This relative positioning of the parts is effected without limiting the diameter of the spring coils because of space restrictions and the springs may be made as flexible as desired for easy action.

Spring supporting links 7 are shown with loops at their upper ends rounded transversely and longitudinally of the truck to readily accommodate angling between the same when the equalizers pivot on their bearings 5, or are inclined from their normal vertical position when the axle is tilted or moves laterally of the truck relative to the frame, or due to other causes. For similar reasons, the concavo-convex bearing is provided for spring seats 9. Accordingly, springs 10 are relieved of any substantial horizontal stresses tending to interfere with their free vertical compression and reaction. If these provisions for additional lateral flexibility are deemed unnecessary, the link connections to the equalizers and springs may be simplified without detracting from the other novel features of the truck.

The truck frame includes integral radius bar extensions 24 merging to form a central tongue 24a arranged for pivotal connection to the locomotive frame (not shown) at a point spaced from the truck axle, but the truck frame may be arranged for attachment of a separately formed radius bar or the invention may be embodied in a truck in which there is no radius bar.

Other variations in details may be made without departing from the spirit of the invention, and the exclusive use of those modifications coming within the scope of the claims is contemplated.

What is claimed is:

1. In a railway engine two-wheel truck, an axle having a journal, a journal bearing thereon, equalizer structure carried by said bearing and extending therefrom longitudinally of the truck, hangers pivotally suspended from said structure and spaced from said bearing transversely of the axle, springs supported from said hangers, a truck frame supported from said springs and including side members, lateral motion devices mounted on said frame between said side members and below the level of the tops of said side members, and a bolster carried on said devices and including end portions movable over said structure when said devices and bolster move laterally.

2. A railway truck construction as described in claim 1 in which the springs comprise upright coils substantially aligned transversely of the truck with the lateral motion devices.

3. A railway truck construction as described in claim 1 in which the spring-supporting structure comprises an equalizer extending over and pivoted on the journal bearing.

4. A construction as described in claim 1 in which the truck frame includes upright webs forming transverse transoms and the frame supporting springs comprise upright coils substantially aligned transversely of the truck with said transoms.

5. A construction as described in claim 1 in which the truck frame includes upright webs forming wheel pieces extending alongside the wheels and the frame supporting springs comprise upright coils portions of which are aligned longitudinally of the truck with said wheel pieces.

6. In a railway engine two-wheel truck, an axle having a journal, journal bearing structure on said journal, an equalizer having a central portion extending over and supported by said structure and having end portions at a substantially lower level, springs supported from the end portions of the equalizer at the level of the axle and alongside the same, a truck frame carried by said springs, a lateral motion device mounted on said frame and spaced from the axle, a bolster having depending members supported on said device and movable thereon transversely of the frame over the end portions of the equalizer, the central part of the bolster being recessed laterally to accommodate the relatively high central portion of the equalizer.

7. In a railway engine two-wheel truck, a rectangular frame comprising wheel pieces and transoms merging with each other and including spring caps at the corners of the frame and spaced below the top of the frame, each merging wheel piece and transom comprising an upright web extending around the outer sides of the spring cap and inclined inwardly and upwardly above the spring cap to form an angular reenforcement of the frame.

8. A structure as described in claim 7 which includes a horizontally disposed flange extending outwardly from the top of the web inclined inwardly and upwardly above the spring cap.

9. In a railway engine two-wheel truck, a rectangular frame including wheel pieces and transoms connecting the same, the frame including spring caps at the corners of the frame and spaced below the top of the frame, the lower portion of each wheel piece at the end of each transom forming a pedestal leg and reenforcing the adjacent spring cap, and a lateral motion bolster having portions projected into the space above said cap and inwardly of the wheel piece.

10. In a railway engine two-wheel truck, an axle having journals inwardly of the wheels, journal bearing structure thereon, an equalizer supported on said structure and extending therefrom transversely of the axle, hangers pivotally suspended from the ends of the equalizer to swing longitudinally and transversely of the truck, springs supported from the lower ends of said hangers, a truck frame mounted on said springs, a lateral motion device mounted on said frame, and a bolster resting on said device and movable laterally of the truck to positions in which its end portions overlie the ends of the equalizer.

11. In a railway engine two-wheel truck, an axle having a journal, a journal bearing structure on said journal, an equalizer supported on said structure and extending transversely of the axle, hangers suspended from the ends of the equalizer, springs supported from the lower ends of said hangers, and a truck frame having a substantially vertical web forming a wheel piece extending between the equalizer and the adjacent wheel, the truck frame including transverse transoms having upwardly facing seats, lateral motion devices on said seats, and a bolster mounted on said devices, the portions of the bolster above said seats being movable laterally of the truck into the space between the hangers at one side of the truck and over the associated equalizer.

12. In a railway engine two-wheel truck, an axle, journal bearing structure thereon, an equalizer supported on said structure and extending longitudinally of the truck therefrom, hangers suspended from the ends of the equalizer, springs supported from the lower ends of the hangers in line with said structure, and a truck frame having a substantially vertical web forming a wheel piece positioned outwardly of said springs and structure, transoms extending transversely from the wheel piece forming web, spring caps adjacent the ends of the transoms, pedestals depending from said wheel piece forming web with their upper portions reenforcing said spring caps, lateral motion devices carried by said transoms, and a bolster mounted on said devices and movable thereon laterally of the truck into the space between the hangers and over said structure.

13. In a railway engine two-wheel truck, an axle having a journal, a journal bearing structure on said journal, a truck frame comprising a wheel piece, including a vertical web extending longitudinally of the truck, with pedestal legs depending therefrom and including vertical webs extending transversely of the truck for receiving said structure between them, the outer side of the pedestal legs being in vertical alignment with said wheel piece web and the structure engaging faces of the pedestal legs extending inwardly of said wheel piece web, an equalizer bar extending longitudinally of the truck over said structure and alongside said wheel piece web, hangers suspended from the ends of said equalizer bar, and upright springs carried by said hangers behind said pedestal leg webs and supporting said frame.

14. In a railway engine two-wheel truck, an axle having a journal, journal bearing structure on said journal, an equalizer on said structure and extending longitudinally of the truck, springs supported from the equalizer at the sides of said structure and spaced therefrom transversely of the axle, a truck frame supported from said springs and including a wheel piece web in a vertical plane positioned outwardly of the equalizer, transoms extending inwardly from the wheel piece web and in alignment with said springs and having upwardly facing seats, lateral motion devices mounted on said seats, and a bolster carried on said devices, the portions of said bolster over said seats being movable over the equalizer.

15. In a railway engine two-wheel truck, a truck frame, a wheeled axle having a journal, journal bearing structure thereon inwardly of the wheels, springs at the sides of said structure and spaced therefrom transversely of the axle, the frame including upright webs forming longitudinal and transverse members merging at their intersections and there provided with spring caps resting on said springs, lateral motion devices mounted on said transverse members, and a bolster carried on said devices and movable over said spring caps.

JAMES C. TRAVILLA, Jr.